A. VASSELLI.
LEVEL WINDER.
APPLICATION FILED MAR. 10, 1919.
1,328,066.
Patented Jan. 13, 1920.
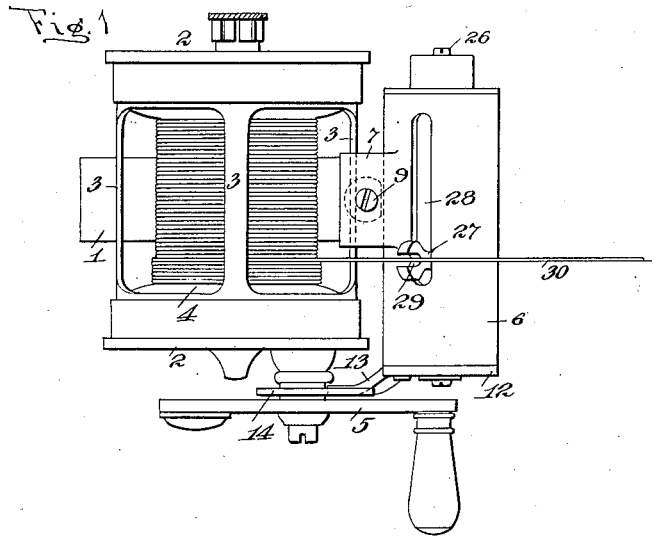
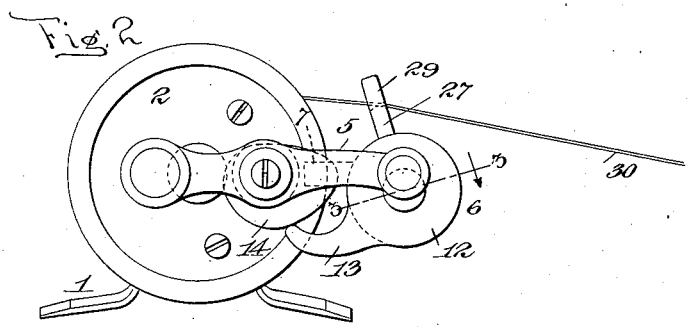
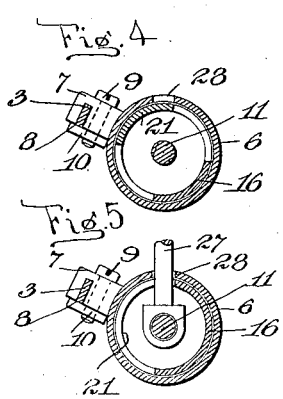
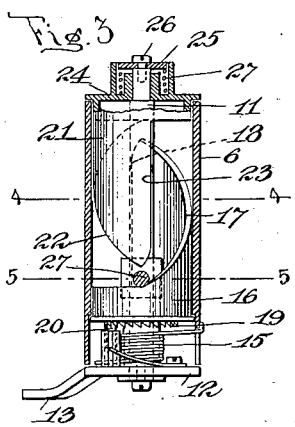
Inventor
Anthony Vasselli
by Schechter & Loeb
his Attorneys

UNITED STATES PATENT OFFICE.

ANTHONY VASSELLI, OF NEWARK, NEW JERSEY, ASSIGNOR, BY MESNE ASSIGNMENTS, TO HARRIMAN NATIONAL BANK OF THE CITY OF NEW YORK.

LEVEL-WINDER.

1,328,066.  Specification of Letters Patent.  Patented Jan. 13, 1920.

Application filed March 10, 1919. Serial No. 281,775.

*To all whom it may concern:*

Be it known that I, ANTHONY VASSELLI, a citizen of the United States, and a resident of the city of Newark, county of Essex, and State of New Jersey, have invented a certain new and useful Level-Winder, of which the following is a specification.

My invention relates to level winders for fishing reels, wherein on winding the line on the spool, the line is fed back and forth longitudinally of the axis of the spool whereby the line will be wound smoothly thereon.

The objects of my invention are to provide an attachment for fishing reels, which will lay the line evenly on the spool of the reel, which will be strong and durable, which will not easily get out of order, and which may be readily removed from the reel.

A further object of the invention is the construction of a device of the character herein described, simple in construction, thoroughly reliable and efficient in its purpose, positive in operation, easily manipulated, and so designed and constructed that it may be attached to fishing reels now in general use.

With these and other objects in view to be more fully set forth hereinafter, the invention consists in the novel construction, combination of elements, and arrangement of parts which will be exemplified in the construction hereinafter described in the specification and illustrated in the accompanying drawings considered together or separately.

The inventive idea involved is capable of receiving a variety of mechanical expressions, one of which for the purpose of illustrating the invention, is shown in the accompanying drawings.

The invention will be first described in connection with the accompanying drawings illustrating one embodiment of my invention, wherein similar reference characters are used to designate corresponding parts throughout the several views, and then more specifically defined and indicated in the appended claims.

In the drawings,—

Figure 1 is a plan view of a reel provided with my invention;

Fig. 2 is a side elevation of the same;

Fig. 3 is a partial sectional view, the section being taken on the line 3—3 of Fig. 2;

Fig. 4 is a section on the line 4—4 of Fig. 3; and

Fig. 5 is a section on the line 5—5 of Fig. 3.

I have illustrated my invention as applied to a well-known form of reel having a rest or support 1, circular end plates 2, to which are secured columns connecting rods 3, a spool 4, being between the end plates and within the connecting rods, and on the outer side of one of the end plates is a winding handle 5. I desire to have it understood that my invention is not to be limited to a reel of the character described, but that my invention may be applied to other forms of reels.

The winder comprises a cylindrical shell 6 provided with a projecting lug 7 having a slot 8 which is adapted to engage the forward column 3 of the reel. A screw 9 passes through the lug and carries a nut 10 by means of which the shell may be clamped to the column in the desired position.

Carried within the cylindrical shell is a shaft 11 which is free to rotate therein, one end of said shaft has rotatably mounted thereon a cap 12 for closing one end of the shell. The cap 12 carries a tail 13 which projects in the path of a cam 14 secured to the shaft of the winding handle 5. A spring 15 wound around the shaft 11 is attached at one end to the shell 6, and at its other end engages the cap 12, whereby the tip of the tail 13 is held in engagement with the periphery of the cam 14.

Rigidly secured to the shaft 11, and within the cylindrical shell 6, is a cylindrical cam 16, having a substantially spiral shaped face 17 extending longitudinally of the shaft, and another face 18 of said cam being straight. The circular end of the cam member carries an annular row of ratchet teeth 19 which teeth are engaged by a spring pressed pawl 20 carried by the cap 12.

Rigidly secured to the shaft 11 and within the cylindrical shell 6, is a second cylindrical cam 21, the spiral face 22 of which is opposed to the straight face 18 of the cam 16, and the straight face 23 of the second cam is opposed to the spiral face 17 of the cam 16. The cams 16 and 21 are separated a short distance longitudinally of the shaft. The cam 21 has a flange 24 which serves as a cap for the end of the shell, opposite the cap 12. The end of the shaft is non-circular and fits in a correspondingly shaped bore in the cap of the cam 21. A washer 25 held in place by a screw 26 in the end of the shaft, is engaged by a spring 27 which also engages the flange 24, whereby the caps 12 and 24 and the shaft 11 are retained in position in the shell.

Carried on the shaft 11 and freely movable longitudinally thereof is a peg 27 which extends radially from the shaft, between the cams 16 and 21 and extends through a slot 28 in the cylindrical shell 6. The free end of the peg 27 which extends through the slot in said shell, carries a line guide 29. The slot 28 is straight and extends longitudinally of the shell and is of a length approximately equal to the length of the spool 4.

In operation the line 30 is led off the spool, through the guide 29 on the peg 27 and through the guides and tip on the rod (not shown). With the parts in the position illustrated in Fig. 3, the line is led from the spool at one end thereof. On turning the handle in the clock-wise direction, the spool will be rotated in a counter clock-wise direction, as is common in such reels, and the line will be wound upon the spool.

As the handle is rotated, the cam 14 engages the tail 13 and revolves the shaft 11 in the counter clock-wise direction, and the spiral face 17 of the cam 16 will tend to rotate the peg 27 with the shaft. The peg, however, extending as it does, through the straight slot 28 cannot rotate with the shaft and cam, but the cam surface 17 will force the peg to travel toward the opposite end of the shaft. The guide 29 carrying the line in the direction of the axis of the spool and the line will be smoothly laid thereon.

After the high part of the cam passes the tip of the tail 13, the cap 12 with its tail 13 will swing back under the influence of the spring 15 with the tail always in contact with the cam 14. During the backward movement of the cap 12, the pawl 20 will ride over the ratchet teeth 19 and the shaft 11 and cams 16 and 21 will remain stationary for a fraction of a second.

This operation is repeated until the peg reaches the opposite end of the slot 28 at which time the spiral cam face 22 of the cam 21 will engage the opposite side of the peg and move it back to the starting point, when the operation will be renewed as heretofore.

In accordance with the provisions of the patent statutes, I have described the principle of my invention together with the apparatus which I now consider to represent the best embodiment thereof, but I desire it understood that my invention is not confined to the particular form of apparatus herein shown and described, the same being merely illustrative, and that the invention can be carried out in other ways without departing from the spirit of my invention, and, therefore, I claim broadly the right to employ all equivalent instrumentalities coming within the scope of the appended claims, and by means of which objects of my invention are attained, and the new results accomplished, as herein set forth, as it is obvious that the particular embodiment herein shown and described is only one of many that can be employed to attain these objects and accomplish these results.

Having now described my invention, what I claim and desire to secure by Letters Patent is:—

1. A device of the character described, comprising a spool, a crank for rotating the spool, a support carried by the device, oppositely disposed cams carried by the support, a cam carried by the crank, a tail carried by the support and engaging the crank cam, a member loosely carried by the support and disposed between the cams carried thereby, and a guide for the member.

2. A device of the character described, comprising a spool, a crank for rotating the spool, a cam carried by the crank, a cylindrical shell carried by the device, a shaft within the shell, a pair of oppositely disposed cams on the shaft, a peg loosely mounted on the shaft and disposed between the cams thereon, an element loosely carried on the shaft and engaging the crank cam, whereby the rotation of the crank will oscillate the element, a spring for holding the element in engagement with the crank cam, a ratchet carried by the shaft, a pawl carried by the element and adapted to engage the ratchet, there being a longitudinal slot in the shell through which the peg projects, whereby the engagement of one shaft cam with the peg on the movement of the shaft by reason of the rotation of the crank will move the peg in one direction longitudinally of the spool, and the engagement of the other shaft cam will move the peg in the opposite direction longitudinally of the spool, and a line guide carried by the peg.

3. A device of the character described, comprising a spool, a crank for rotating the spool, a cam carried by the crank, a cylindrical shell carried by the device, a shaft within the shell, a pair of oppositely disposed cams on the shaft, a peg loosely mounted on the shaft and disposed between the cams thereon, an element loosely carried on the shaft and engaging the crank cam, whereby the rotation of the crank will oscillate the element, a spring for holding the element in engagement with the crank cam, a ratchet carried by the shaft, a pawl carried by the element and adapted to engage the ratchet, there being a longitudinal slot in the shell through which the peg projects, whereby the engagement of one shaft cam with the peg on the movement of the shaft by reason of the rotation of the crank will move the peg in one direction longitudinally of the spool, and the engagement of the other shaft cam will move the peg in the opposite direction longitudinally of the spool, and a line guide carried by the peg, and means for attaching the shell to the device.

4. A device of the character described, comprising a spool, a crank for rotating the spool, a cam carried by the crank, a cylindrical shell carried by the device, a shaft within the shell, a pair of oppositely disposed cams on the shaft, a peg loosely mounted on the shaft and disposed between the cams thereon, an element loosely carried on the shaft and engaging the crank cam, whereby the rotation of the crank will oscillate the element, a spring for holding the element in engagement with the crank cam, a ratchet carried by the shaft, a pawl carried by the element and adapted to engage the ratchet, there being a longitudinal slot in the shell through which the peg projects, whereby the engagement of one shaft cam with the peg on the movement of the shaft by reason of the rotation of the crank will move the peg in one direction longitudinally of the spool, and the engagement of the other shaft cam will move the peg in the opposite direction longitudinally of the spool, a line guide carried by the peg, and means for removably attaching the shell to the device.

This specification signed and witnessed this 6th day of March, 1919.

ANTHONY VASSELLI.

Witnesses:
JOHN L. LOTSCH,
M. JONES.